United States Patent [19]

Cohen

[11] Patent Number: 4,595,615
[45] Date of Patent: Jun. 17, 1986

[54] PIPE INSULATION FOR COLD WEATHER APPLICATIONS

[75] Inventor: Lewis S. Cohen, Hingham, Mass.

[73] Assignee: Venture Tape Corp., Rockland, Mass.

[21] Appl. No.: 658,120

[22] Filed: Oct. 5, 1984

[51] Int. Cl.⁴ .................. B32B 27/36; C09J 7/02; C09J 7/04
[52] U.S. Cl. .................. 428/36; 156/327; 138/149; 138/151; 427/388.5; 138/155; 138/DIG. 1; 428/40; 138/DIG. 2; 156/304.3; 428/335; 428/61; 428/906; 428/339; 428/341; 428/344; 428/354; 428/355
[58] Field of Search .................. 156/327; 428/40, 335, 428/339, 341, 344, 354, 355; 427/388.5, 379; 428/61; 906; 156/304.3; 138/149, 151, 155, DIG. 1, 2

[56] References Cited

U.S. PATENT DOCUMENTS

| | | | |
|---|---|---|---|
| 3,497,383 | 2/1970 | Olyphant et al. | 428/209 |
| 3,876,454 | 4/1975 | Snell et al. | 428/355 |
| 3,957,724 | 5/1976 | Schurb et al. | 428/447 |
| 3,993,833 | 11/1976 | Esmay | 428/351 |
| 4,060,664 | 11/1977 | McGuire et al. | 428/480 |

Primary Examiner—James C. Cannon
Attorney, Agent, or Firm—Wolf, Greenfield & Sacks

[57] ABSTRACT

An insulation system for pipes which includes segments of fiberglass insulation surrounding the pipe and tape sealing abutting ends of the segments of insulation. The tape is a laminated tape which includes a layer of paper, a layer of fiberglass, a layer of foil and a pressure sensitive acrylic adhesive. The adhesive is an isooctyl acrylate polymer which contains no fillers, except for a cross linker. The tape may be applied at temperatures ranging from −17° F. to 158° F.

15 Claims, 4 Drawing Figures

PIPE INSULATION FOR COLD WEATHER APPLICATIONS

FIELD OF THE INVENTION

This invention relates generally to pipes and insulation therefor, and more particularly to fiberglass insulation and tapes used with fiberglass insulation which can be applied in cold weather.

BACKGROUND OF THE INVENTION

Pipes which are used in dwellings, in commercial buildings or in industrial plants and carry steam for steam heat, hot water, cold water, chemicals or petroleum products and the like, are generally provided with an exterior layer of insulation. Such pipes may be formed of copper, steel, aluminum, plastic, rubber or other like materials. This exterior layer of insulation frequently comprises a fiberglass jacket which is wrapped about the pipe. This fiberglass is generally applied in segments which abut one another, thus leaving gaps between the abutting ends of adjacent segments along the length of the pipe through which heat and moisture can escape. These abutting ends of insulation segments are often sealed by the use of tape wrapped around the pipe. During construction of the building, the pipes are often exposed to great extremes of temperature, ranging from far below 0° F. to above 100° F. Such temperature extremes may also be experienced by the pipe after installation of the pipe when the building is occupied and during times that repairs are required.

At present, there exists no tape which is functional much below 32° F. As a result, it is presently impossible to insulate pipes in unheated buildings during the middle of the winter. Severe constraints are placed upon when construction work can be done, or upon when pipes can be repaired or replaced, particularly in cold climates.

SUMMARY OF THE INVENTION

An object of this invention is to provide an insulation system for pipes which can be applied at either very cold or very warm temperatures.

Another object of this invention is to provide a tape which can be used in conjunction with pipe insulation and which can be used at either extremely cold or extremely warm temperatures.

The foregoing and other objects of this invention are achieved by a pipe insulation system which includes segments of fiberglass insulation which are adapted to be wrapped around the pipe, and a tape for sealing abutting ends of adjacent segments which is functional at either very cold or very warm temperatures. The fiberglass insulation includes a layer of woven fiberglass yarn which is surrounded by a paper jacket which is adhesively affixed thereto. The fiberglass insulation is provided in segments which are wrapped around a pipe of suitable diameter and which are sealed against themselves by an overlapping flap of the paper jacket. The spaces between butting ends of adjacent segments are sealed by the tape which is wrapped about the abutting ends of the insulation segments.

The tape is typically a laminate comprised of an outer paper layer, a layer of woven fiberglass yarn adhered to the outer paper layer by a laminating adhesive, a foil layer secured to the other side of the fiberglass layer by a laminating adhesive, a pressure sensitive acrylic adhesive secured to the foil, and a release paper covering the adhesive. The pressure sensitive acrylic adhesive is preferably an isooctyl acrylate polymer which has no fillers and is generally pure except for a standard cross linker. This adhesive remains tacky at temperatures ranging from $-17°$ F. to $+158°$ F. This adhesive has a preferred coating weight of 1.27 dry ounces per square yard. When applied to the foil layer, the pressure sensitive adhesive uses a process in which it is cured in a two zone oven at temperatures of 150° F. and 270° F. and in which the time in each zone is one half to one minute to drive off all but no more than $\frac{1}{2}\%$ of the solvent.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENTS

Figure 1:
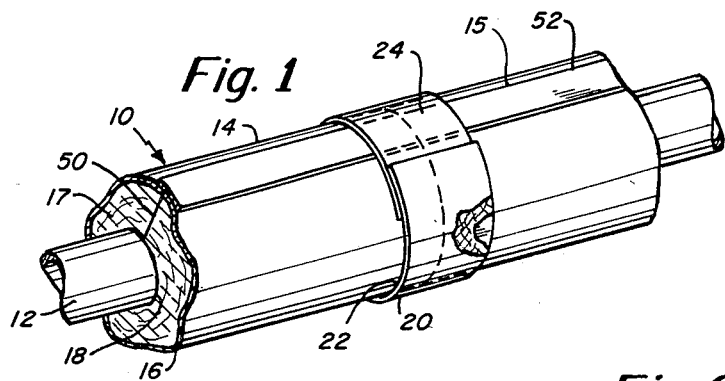
FIG. 1 is a cut away, pictorial view of the insulation system of this invention in conjunction with a pipe.

With reference now to the drawings, and more particularly to FIG. 1 thereof, the insulation system of this invention will be described. FIG. 1 shows a portion of an insulation system 10 installed for insulating a pipe 12. Pipe 12 may be any conventional hot or cold water pipe or steam pipe or pipe for carrying chemicals or petroleum products used in a building, whether a commercial building or a dwelling or an industrial plant. Pipe 12 may be formed of any conventional material, such as copper, steel, a plastic, aluminum or rubber.

Insulation system 10 includes tape 20 and a plurality of abutting insulation segments which are disposed along the length of pipe 12 to seal pipe 12 against the elements. Two exemplary segments 14 and 15 are shown in abutting relationship in FIG. 1. Segments 14 and 15 abut one another at respective ends 22 and 24 and tape 20 is adapted to be wrapped around segments 14 and 15 to seal abutting ends 22 and 24. Segments 14 and 15 are each typically comprised of a flame resistant, vapor barrier material, comprising a flame retardant paper layer 16, a layer 17 of woven fiberglass yarns, and a metallized layer 18. The kraft paper layer and the metallized layer 18 are secured to opposite sides of the fiberglass layer 17 with a flame resistant laminating adhesive. In one embodiment, the metallized layer 18 is a layer of aluminum foil with a thickness in the range of 0.00035 to 0.0007 inches. In another embodiment, the metallized layer 18 is an aluminized polyester film of about one half mil thickness. In a preferred embodiment, paper layer 16 is a high intensity, white, chemically treated kraft paper, and the weight of the paper is in the order of 45 pounds per 3,000 square feet. In a preferred embodiment, layer 17 of fiberglass scrim yarns is a tri-dimensional 5×5 fiberglass. The laminating adhesive used is any conventional flame retardant, thermo-setting adhesive suitable for such uses. Segments 14 and 15 are split along line 50, and are sealed against themselves by flap 52 provided on paper layer 16.

Figure 2:
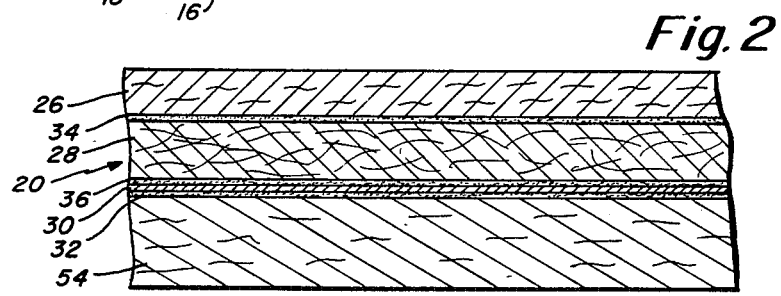
FIG. 2 is a cross sectional view of the tape of the system of FIG. 1.

With reference now to FIG. 2, the structure of tape 20 will be described. In a preferred embodiment, tape 20 should be a laminate having about the same structure as that of segments 14 and 15, except for a thinner fiberglass layer and a pressure sensitive adhesive. However, it is not necessary that tape 20 have the same structure as segments 14 and 15. Tape 20 preferably is a laminate as shown in FIG. 2 and includes a layer 26 of paper, a layer 28 of fiberglass, a metallized layer 30, a layer 32 of a pressure sensitive adhesive, and layer 54 of release paper. Paper layer 26 and fiberglass layer 28 are secured together using a laminating adhesive 34, while fiberglass layer 28 and metallized layer 30 are secured together by a laminating adhesive 36. Paper layer 26 preferably is a high intensity, white, chemically-treated kraft paper which is flame-retardant. Fiberglass layer 28 is made of woven fiberglass yarns, and can be either a tri-directional or diamond pattern weave, or a scrim having a square weave, such as a 5×5 scrim. Laminating adhesives 34 and 36 can be any conventional, thermo setting, flame-retardant adhesives which are suitable for laminating fiberglass to paper and to polyester or metal. Layer 30 can be either a layer of aluminum foil, or a layer of metallized polyester film. Typically, if metallized polyester film is used, the metal deposited thereon is aluminum. Release paper layer 54 can be any conventional release paper which is suitable for use with an acrylic adhesive.

In a preferred embodiment, paper layer 26 has a thickness of about 0.0003 inches, fiberglass layer 28 has a thickness of about 0.0004 inches, layer 30 has a thickness in the range of about 0.00035 to 0.0007 inches if layer 30 is an aluminum foil, and layer 54 has a thickness of about 0.00065 inches. If layer 30 is a metallized polyester, the thickness of layer 30 is about one half mil. If layer 30 is a layer of aluminum foil having a thickness less than 0.0005 inches, a barrier coat is used on the side of layer 30 facing laminating adhesive 36 to seal layer 30 against moisture. In a preferred embodiment, the weight of paper layer 26 would be about 45 pounds per 3,000 square feet.

A commercially available, acceptable material which comprises paper layer 26, fiberglass layer 28, and metallized layer 30 can be purchased from Lamtec Corporation, Bartley-Chester Road, Post Office Box 37, Flanders, N.J. 07836 under the product designation 70J All Service Jacketing. Another commercially available, acceptable material can be purchased from Alpha Associates, Inc., 2 Amboy Ave., P.O. 128, Woodbridge, N.J. 07095 under the product designation Alpha-Temp, Style ASJ/MAR. Another acceptable commerically available material can be purchased from Manville Building Materials Corporation, Ken-Caryl Ranch, P.O. Box 5108, Denver, Colo. 80217 under the product designation Foil Scrim Kraft ASJ.

Adhesive layer 32 is a pressure sensitive acrylic adhesive, preferably an isooctyl acrylate polymer. There are no fillers in the adhesive, except a conventional cross linker. When cured, adhesive layer 32 approaches a 100% acrylate compound in which almost all solvents have been eliminated. However, adhesive layer 32 can tolerate up to ½% of solvents after curing and still perform as desired. When cured, adhesive layer 32 typically has a thickness of between 1.5 and 2 mils, and a coating weight of about 1.27 dry ounces per square yard. The specific gravity of the adhesive in layer 32 is about 0.92, and the William Plasticity is about 2.6.

One acceptable, commercially available form of the adhesive found in adhesive layer 32 may be purchased from National Starch And Chemical Corporation, Finderne Avenue, Bridgewater, N.J. 08807 under the trademark DURO-TAK, with the product designation 80-1058. When purchased commercially, this adhesive contains 38% by weight of solids with a viscosity of 7,000 CPS. The solvent system of this commercially available adhesive includes 55% ethyl acetate, 17% heptane, 26% isopropyl alcohol, and 2% toluene.

In the preferred method of assembling tape 20, paper layer 26, fiberglass layer 28 and metallized layer 30 are laminated together in a known method using laminating adhesives 34 and 36. Thereafter, the adhesive system in a solvent solution, such as the commercially available DURO-TAK product, is applied directly to layer 30. The adhesive is then cured by passing the entire laminate comprising paper layer 26, fiberglass layer 28, layer 30 and adhesive layer 32 through a multiple zone oven, preferably a two-zone oven. The oven is exhausted so that the pressure therein is below atmospheric. Tape 20 is initially introduced in a first zone at ambient temperatures, and the heat is gradually increased until it reaches 150° F. Typically the travel time of tape 20 through the first zone is in the range of one half minute to one minute. Thereafter, tape 20 is passed to a second zone in the oven in which the temperature is raised to 270° F. The travel time through the second zone is in the range of one half minute to one minute. If a two-zone oven is used, tape 20 is thereafter removed from the oven. In a three- or four-zone oven, the total residence time is the same, and the temperature is increased from ambient to 270° F. in three or four stages respectively instead of two. This curing process removes solvents in adhesive layer 32 until the solvent level is reduced to less than ½%. As indicated, the resulting composition of adhesive layer 32 is about a 100% acrylate compound.

Once adhesive layer 32 has been cured, a layer 54 of conventional release paper is applied to adhesive layer 32. Release paper 38 can be removed by the user when it is desired to apply tape 20 to ends 22 and 24 of segments 14 and 15.

Figure 3:
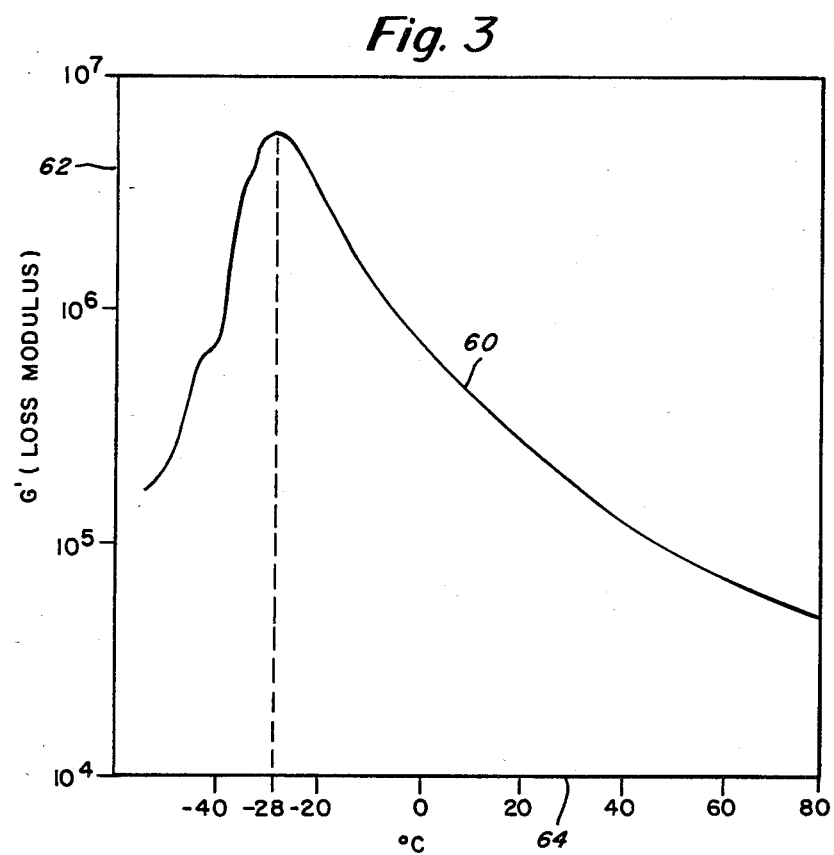
FIG. 3 is a graph showing a plot of the loss modulus versus temperature for the pressure sensitive adhesive of the tape of this invention.
Figure 4:
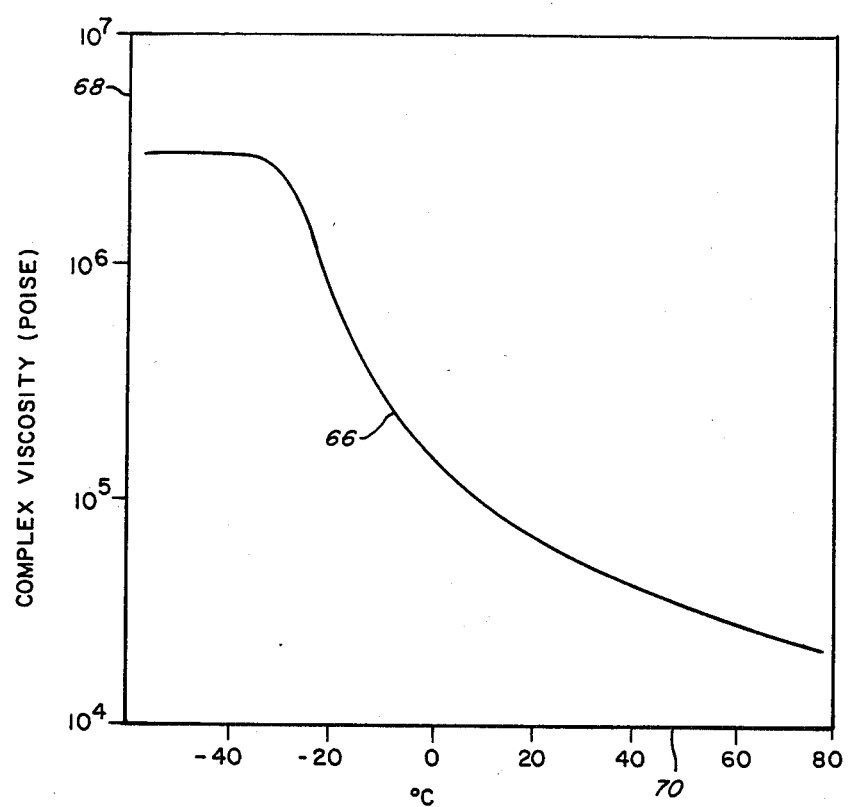
FIG. 4 is a graph showing a plot of complex viscosity versus temperature for the adhesive of the tape of this invention.

Typical characteristics of the adhesive used in adhesive layer 32 are shown in FIGS. 3 and 4. FIG. 3 shows a plot 60 of the loss modulus 62 of the adhesive as a function of the temperature 64 in degrees Centigrade. The glass transition temperature, or the temperature at which the adhesive acquires a glass-like surface is −28° C. FIG. 4 shows a plot 66 of the complex viscosity 68 in poise of the adhesive as a function of temperature 70 in degrees Centigrade.

By providing an adhesive layer 32 formed of a isooctyl acrylate polymer which contains no fillers, and which contains less than ½% solvents, adhesive layer 32 remains tacky and usable down to temperatures as low as −17° F., and thus can be utilized by workers in cold environments. In addition, the adhesive remains tacky up to temperatures as high as 158° F. The suitability of tape 20 for low temperature applications is further enhanced by the thinness of layer 32. Such a thin layer continues to be flexible even at very low temperatures. No other such tape can be used at temperatures much below +25° F. in conjunction with pipe insulation.

In use, insulation segments 14 and 15 are preformed for a particular size pipe 12. Segments 14 and 15 are split at precut line 50, and are wrapped around pipe 12. As indicated, pipe 12 may be any type of pipe for carrying hot or cold water or steam. Once insulation segments 14 and 15 have been wrapped about pipe 12, flap 52 on paper layer 16 is sealed over line 50 to seal segments 14 and 15 about pipe 12 against heat and vapor. Tape 20 is then applied to ends 22 and 24 of segments 14 and 15 to seal the gap therebetween against both heat and vapor. The provision of metallized layer 30, insures a proper vapor seal, while fiberglass layer 28 provides the required insulation against heat loss. Adhesive layer 32 insures that tape 20 is adequately and tightly secured to ends 22 and 24 of segments 14 and 15, and paper layer 26 provides the required covering.

Modifications and improvements will occur within the scope of this invention to those skilled in the art, and the above description is intended as exemplary only. The scope of this invention is defined only by the following claims and their equivalents.

What is claimed is:

1. An insulation system for a pipe comprising:
   a first segment of insulation wrapped about the pipe and having a first end;
   a second segment of insulation wrapped about the pipe, said second segment of insulation having an end adjacent to and abutting with said first end of said first segment; and
   means for sealing the space between said first end of said first segment and said end of said second segment, said sealing means comprising the following layers:
   a layer of paper;
   a layer of woven fiberglass yarns adhesively secured to one side of said paper layer;
   a metallized layer secured by a laminating adhesive to said fiberglass layer; and
   a layer of pressure sensitive, isooctyl acrylate adhesive disposed on said metallized layer, said adhesive being approximately a 100% acrylate compound and having a solvent content of no greater than one half of 1%.

2. An insulation system as recited in claim 1 wherein said adhesive layer remains tacky in a temperature range from −17° F. to +158° F.

3. An insulation system as recited in claim 1 wherein said adhesive layer has a thickness in the range of about 1.5 to 2.0 mils.

4. An insulation system as recited in claim 1 wherein said adhesive layer has a coating weight of about 1.27 dry ounces per square yard.

5. An insulation system as recited in claim 1 wherein said metallized layer is a metallized polyester film.

6. An insulation system as recited in claim 1 wherein said metallized layer is a layer of aluminum foil having a thickness in the range of about 0.00035 to 0.0007 inches.

7. An insulation system as recited in claim 1 further comprising a barrier coat on one side of said metallized layer.

8. An insulation system as recited in claim 1 wherein said fiberglass layer comprises a tri-directional weave of fiberglass yarns.

9. An insulation system as recited in claim 1 wherein said first and said second insulation segments comprise the following layers:
   a layer of paper;
   a layer of woven fiberglass yarns adhesively laminated to one side of said paper layer; and
   a metallized layer adhesively laminated to one side of said fiberglass layer.

10. An insulation system as recited in claim 1 wherein said adhesive layer is formed by a method comprising the steps of:
    applying an isooctyl acrylate polymer adhesive dissolved in a solvent solution to one side of said metallized layer in a thickness sufficient to produce a coating weight of about 1.27 dry ounces per square yard when cured;
    passing said sealing means through a first heating zone in which the temperature is gradually raised from ambient temperature to 150° F., said first passing step lasting about one half to one minute; and
    passing said sealing means through a second heating zone in which the temperature is gradually increased to 270° F., said second passing step having a duration of about one half to one minute.

11. A tape for sealing the space between abutting ends of adjoining segments of pipe insulation comprising:
    an exterior layer of paper;
    a layer of woven fiberglass yarns adhesively secured to one side of said paper layer;
    a barrier coat secured to said fiberglass layer;
    a metallized layer adhesively secured to said barrier coat; and
    a layer of pressure sensitive, isooctyl acrylate polymer adhesive disposed on an outwardly facing side of said metallized layer, said adhesive being approximately a 100% acrylate compound and having a solvent content of less than one half of one per cent.

12. A tape as recited in claim 11 wherein said adhesive layer has a thickness of about 1.5 to 2.0 mils, and a coating weight of 1.27 dry ounces per square yard.

13. A tape as recited in claim 11 wherein said adhesive has a Williams plasticity of about 2.6 mm.

14. A tape as recited in claim 11 wherein said metallized layer is a layer of aluminum foil having a thickness of about 0.00035 inches.

15. A tape as recited in claim 11 wherein said metallized layer is a metallized polyester film.

* * * * *